April 22, 1941.  E. MARTIN ET AL  2,239,445
SPEED RESPONSIVE CONTROL DEVICE
Filed April 6, 1939
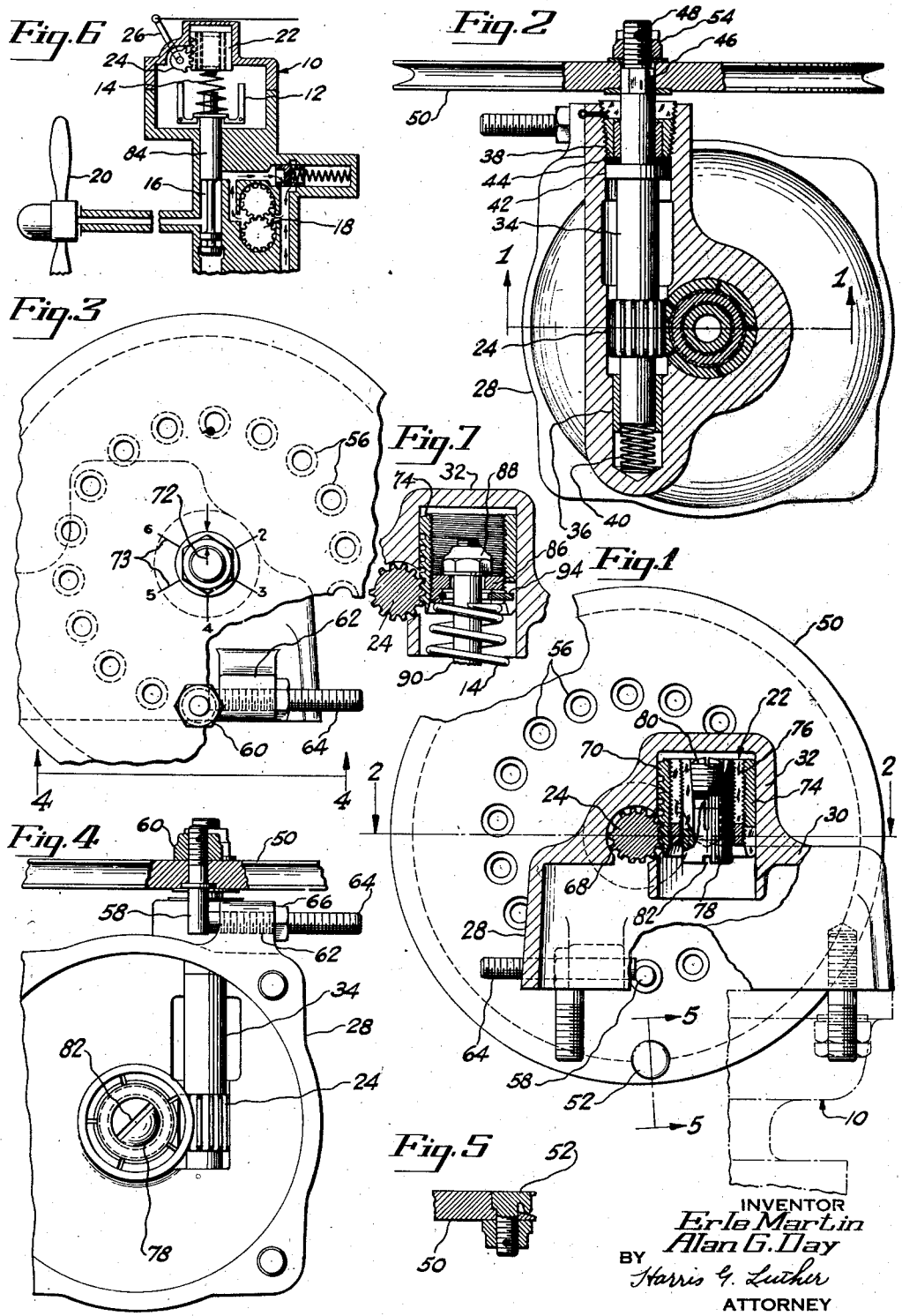
INVENTOR
Erle Martin
Alan G. Day
BY Harris G. Luther
ATTORNEY Patented Apr. 22, 1941

2,239,445

UNITED STATES PATENT OFFICE 2,239,445

SPEED RESPONSIVE CONTROL DEVICE

Erle Martin and Alan G. Day, West Hartford, Conn., assignors to United Aircraft Corporation, East Hartford, Conn., a corporation of Delaware Application April 6, 1939, Serial No. 266,405

6 Claims. (Cl. 264—3)

This invention relates to improvements in speed responsive control devices and has particular reference to improvements in adjustable engine governors.

An object of the invention resides in the provision of adjustable stop means for limiting the speed range of a governor controlled engine.

A further object resides in the provision of adjustable limit stops for the speed setting mechanism of an adjustable governor, adjustable to provide the same governor controlled speed range for various arrangements of governor adjusting connections.

A still further object resides in the provision of an improved governor adjusting mechanism and limit stops therefor so arranged that the calibration of the adjusting mechanism with the action of the governor will be maintained in all of several different relations of assembly of the adjusting means with respect to the governor.

An additional object resides in the provision of an adjustable setting for the speed changing mechanism of a speed governor so arranged that the speed changing mechanism may be set to provide a predetermined maximum speed at a predetermined rotation of the speed changing means from its minimum low speed condition, or may be set to provide predetermined governed speeds at each end of the range of movement of the speed changing mechanism.

Other objects and advantages will be more particularly pointed out hereinafter or will become apparent as the description proceeds.

In the accompanying drawing, in which like reference numerals are used to designate similar parts throughout, there is illustrated, by way of example, a constructional form of governor adjusting mechanism and limit stops therefor constructed according to the invention. The drawing, however, is for the purpose of illustration only and is not to be taken as limiting or restricting the scope of the invention.

In the drawing,

Fig. 1 is a vertical sectional view taken on the line 1—1 of Fig. 2 of a speed governor adjusting mechanism showing limit stops constructed according to the invention applied thereto.

Fig. 2 is a sectional view on the line 2—2 of Fig. 1 looking in the direction of the arrows, portions of the pulley being shown in full.

Fig. 3 is an elevational view of a portion of the governor adjusting mechanism and one of the improved limit stops with a portion of the pulley broken away.

Fig. 4 is a plan view taken in the directions shown by the arrows 4—4 of Fig. 3 of the governor cap from the inside showing the governor adjusting mechanism and the adjustment limit stop. A portion of the adjusting pulley is broken away to better illustrate the construction of the limit stop associated therewith.

Fig. 5 is a sectional view on the line 5—5 of Fig. 1 showing in detail the cable clamp associated with the governor adjusting pulley.

Fig. 6 is a diagrammatic illustration of the operation of a speed controlling governor when applied to control a controllable pitch propeller to regulate the speed of a propeller driving engine, and Fig. 7 is a sectional view of a fragmentary portion of a somewhat modified form of governor and adjusting mechanism.

As is well known, many propulsive power plants, particularly propulsive power plants for aircraft are equipped with constant speed regulating means. The speed regulating includes some form of engine driven governor, such as a centrifugal type governor, which acts on some speed controlling device to regulate the speed of the engine. Such a governor may act on the engine throttle to control the speed by regulating the amount of fuel supplied to the engine or may, as illustrated in Fig. 6, act to control the pitch of a controllable pitch propeller to regulate the speed of the engine by controlling the loads imposed on the engine by the propeller. A suitable controllable pitch propeller adapted to be controlled by an engine driven governor is particularly illustrated and described in United States Patent Number 2,135,190, issued November 1, 1938, to Erle Martin for Aeronautical propeller, and a suitable governor and governor actuated valve for controlling such a propeller is particularly illustrated in British Patent Number 470,284, accepted August 12, 1937, issued to the Woodward Governor Company.

While the governor by acting on the engine throttle or on the controllable pitch propeller, is capable of maintaining the engine speed substantially constant at a particular rate, it is necessary to vary the engine speed for different operating conditions, for instance a high rate of speed is required for take-off and for full-power flight while a somewhat lower rate may be used for moderate climb and a still lower rate for cruising. In order to have the engine operate at these different required speeds it becomes necessary to provide some means for adjusting the speed setting of the engine speed controlling governor. Where the governor, as indicated at 10 in Fig. 6, is provided with flyweights 12 and a speeder spring 14, the speed setting of the governor may be changed by changing the loading on the speeder spring to change the force opposing the action of the flyweights 12 tending to move the control elements, which may be the valve 16 regulating the supply of hydraulic fluid from the pump 18 to the propeller 20. The loading on the speeder spring may be varied by changing the position of a movable abutment 22 by suitable means such as the manually rotatable gear element 24 the teeth of which mesh with rack teeth provided in one side of the abutment 22. With this arrangement the speed setting of the governor may be changed to provide the proper engine speed for different operating conditions by moving the manually movable element 26.

It is also important that, particularly in the case of aircraft engines, the engine be prevented from exceeding a predetermined rate of speed under any circumstances. As the operating connection for the governor adjustment varies somewhat with different installations it is desirable that the limit stop arrangement be sufficiently flexible so that it can be accommodated to the various connections and will function in any installation to limit the governor adjustment to a definite predetermined engine speed range.

In the arrangement illustrated, the governor is provided with a hollow cover member 28 having an end wall 30 provided substantially coaxially thereof with an integral cylinder 32 within which the movable abutment 22 is reciprocable. The gear 24 is disposed in an aperture having its axis at right angles to the axis of the cylinder 32 and the gear shaft 34 is mounted in bearings 36 and 38 provided in the aperture. The rear bearing 38 is removable and a spring 40 is inserted between the closed end of the aperture and the adjacent end of the shaft to hold the shaft pilot 42 against the packing 44 to prevent leakage of oil around the end of the shaft. With this arrangement it is apparent that rotation of the shaft 34 and gear 24 will move the abutment 22 up and down in the cylinder 32. The shaft is provided on the portion thereof which projects outside of the cover 28 with a hexagonal portion 46 and a screw threaded end 48. A cable pulley 50 having in one portion thereof adjacent its periphery a cable clamp 52 is retained upon the hexagonal portion 46 by means of a nut 54 threaded onto the screw threaded portion 48.

The cable pulley is provided with a series of spaced circularly arranged holes 56 into any one of which may be inserted a stop pin 58 secured by a nut 60 screw threaded onto one end thereof. The cover member 28 is provided with an internally screw threaded lug 62 through which is threaded an abutment pin 64 held in adjusted position by a lock nut 66. As is clearly shown in Figs. 3 and 4 contact of the abutment end of the pin 64 by the inwardly projecting end of the pin 58 will limit rotation of the pulley 50 in one direction and thereby limit the corresponding movements of the abutment 22.

In order to predetermine the assembly relation of the gear 24 with the rack and the abutment 22, one tooth is omitted from the gear, as indicated at 68 and an elongated tooth is provided at one end of the rack as indicated at 70. In assembling this part of the device the gear shaft 34 is first inserted in the receiving aperture in the cover and the bearing 38 secured in place. The abutment is then entered into the open bottom end of the cylinder 32 and the gear rotated until the gap 68 takes the elongated tooth 70, after which the gear may be rotated to move the abutment into the cylinder to such a position as is illustrated in Fig. 1. The adjusting cables from the pilot control in the airplane cockpit (not shown) or from any other control may be brought in to the pulley 50 from different positions, the usual positions being parallel to the line 2—2, or downwardly from above, or upwardly from below. As there is only one cable clamp this means that the pulley must be rotated relative to the gear 24 so that the cable clamp will be positioned approximately at the center of the loop of the cable which wraps around the pulley 50. The end of the shaft is provided with an indicating mark 72 and the pulley has six radial indicia 73 disposed one at each corner of the hexagonal aperture and consecutively numbered. The holes 56 are so arranged that there is a group of three holes corresponding to each of the indicia 73. When the pulley is associated with the shaft 34 so that the shaft mark 72 is opposite a particular indicating mark 73 the pin 58 will be inserted in one of the holes of the corresponding group so that the limit stop will be effective in the same manner regardless of the position of the pulley on the shaft as necessitated by the positioning of the cable clamp 52, the relation of the shaft gear 24 to the abutment 22 being always the same, as has been pointed out above. The proper hole for the pin 58 may be determined by counting off in a clockwise direction from the hole in which the pin was originally inserted a number of holes equal to three times the number of indicia opposite the mark 72. The several holes in each group are provided to provide a coarse adjustment for the limit stop so that the governor may be calibrated to hold the engine speed at approximately the required rate when in its limiting position. After the proper hole has been selected to bring the engine speed as near as possible to the required rate, the pin 64 is adjusted through the lug 62 until substantially the exact rate required is obtained. If, after the governor has been calibrated and the limit stop set, it is necessary to change the position of the pulley 50 relative to the shaft 34 this can be done and the proper adjusting of the limit stop obtained by merely moving the pin 58 from the hole in the group in which it is located to the corresponding hole in the group indicated by the position of the mark 72 with respect to the numbered faces of the hexagon 46. While the limit stop including the pins 58 and 64 provide a high speed limit for the governor controlled operation of the engine the abutment 22 itself provides a limit stop for the low speed end of the operating range. This abutment may conveniently comprise an internally threaded exterior sleeve 74 having the rack teeth cut into one side thereof. Within the sleeve 74 there is a second sleeve 76 screw threaded on both sides and longitudinally slotted for the greater portion of its length. A hollow plug 78, slotted in a manner similar to the sleeve 76 is screw threaded into the sleeve 76 and is provided with internal screw threads which receive a tapered plug 80 for expanding the slotted ends of the plug 78 and a sleeve 76 to rigidly lock these elements together and to the outer sleeve 74. The plug 78 is provided in its lower end with a tool slot 82 for adjusting this member relative to the elements 76 and 74. The member 76 can be adjusted relative to the member 74 to bring its upper end slightly above the upper end of the member 74 in which case the upper end of the member 76 will abut against the closed upper end of the cylinder 32 and provide a limit stop for upward movement of the abutment to thereby constitute a low speed limit stop for the device. The plug 78 can be adjusted to determine the position of the abutment for positive low pitch operation of the propeller. As the relation of the abutment to the gear 24 cannot be changed the same adjustment of the elements 76 and 78 will always provide the same limits for the governor operation.

As the component parts of each governor, particularly the speeder springs and flyballs, vary within reasonable tolerances, the same setting will not necessarily produce exactly the same governed speed for various governors and it, therefore, becomes necessary to calibrate the governors for the speeds desired. Where it is necessary to control only the maximum speed, as where the governors are used to control counter-weight type propellers, the governor adjusting means, as particularly shown in Fig. 7, may first be brought to a high pitch low speed position in which the rack member 74 bottoms against the end of its cylinder 32. The pulley 50 is then rotated from that position a specified number of degrees and the pin 58 is inserted in the hole nearest the proper end of the lug 62 and the screw 64 adjusted until it contacts the pin. The member 86 is then adjusted until the spring 14 is properly loaded to give the correct maximum speed value, and is locked in place by the spring ring 94. When the pulley is rotated back to its original position contact of the member 86 with the undersurface of the nut 88 on the upper end of the stem 90 which is, in effect, a continuation of the governor valve stem 84, opens the governor valve when the rack 74 bottoms against the end of the cylinders 32, to place the propeller in its high pitch condition. Thus, with the above described arrangement the governor will be adjusted from its positive propeller high pitch setting to its maximum speed setting with a predetermined angular rotation of the pulley 50 and all governors of the type can be so calibrated that the entire range of adjustment from the positive high pitch setting to the same maximum speed will be covered by the same angular movement of the pulley 50.

When it is desired to limit both the minimum and maximum speeds for which the governor may be set, as may be the case when the governor is used to control a "Hydromatic" type propeller, the governor may be first adjusted for the desired minimum low speed by adjusting the plug 76 upwardly to contact the closed end of the cylinder 32 when the spring 14 is properly loaded for the low speed desired. This setting will necessarily predetermine the low speed position of the pulley 50 and provide a stop for the pulley in that position. The pulley may now be rotated in a direction to compress the spring 14 until the proper governor setting for the maximum speed is obtained. The pin 58 may then be inserted in the hole nearest the left hand end of the lug 62 and the screw 64 adjusted until it contacts the pin thus providing a positive limit stop for the high speed setting of the governor. The movement of the pulley 50 between the two limit stops then covers the available range of governor controlled speeds. After the governor is installed minor corrections of the high speed setting may be made by adjustment of the screw 64.

While the form of abutment plug illustrated, is in two parts, 76 and 78, it is to be understood that the use of a one part plug in no way exceeds the scope of the present invention.

While a particular mechanical arrangement has been hereinabove described and illustrated in the accompanying drawing for the purpose of disclosing the invention, it is to be understood that the invention is not limited to the particular arrangement so illustrated and described, but that such changes in the size, shape and relation of the various parts may be resorted to as come within the scope of the sub-joined claims.

Having now described the invention so that others skilled in the art may clearly understand the same, what it is desired to secure by Letters Patent is as follows:

1. Mechanism for changing the speed setting of an adjustable speed governor comprising, a movable abutment, a rack and gear for moving said abutment, means constraining the assembly of said gear to said rack in the same relative rotational position at all times, a pulley operatively associable with said gear in several relative rotational positions having a group of holes for each particular rotational position, and means providing a limit stop for said speed adjusting mechanism comprising, a pin adjustable in a relatively fixed lug, and a second pin insertable into any one of said holes in said pulley to contact the end of the pin in said fixed lug at a predetermined rotational position of said pulley.

2. Mechanism for changing the speed setting of an adjustable speed governor comprising, a movable abutment, a rack and gear for moving said abutment, and a pulley for rotating said gear, a pin adjustable in a relatively fixed lug, and a second pin insertable into any one of a plurality of holes spaced about the rotational center of said pulley and adapted to engage said lug carried pin at a predetermined rotational position of said pulley, said holes being arranged in a plurality of groups and the holes in each group being spaced to provide a coarse adjustment of the high speed limit stop by selecting a particular hole of the appropriate group for the insertion of said second pin.

3. Mechanism for changing the speed setting of an adjustable speed governor comprising, a movable abutment, a rack and gear for moving said abutment, and a pulley for rotating said gear, and means constituting a high speed limit stop for said speed changing mechanism comprising, a pin adjustable in a relatively fixed lug, and a second pin insertable into any one of a plurality of holes spaced about the rotational center of said pulley, said holes being arranged in groups and the holes in each group being spaced to provide a coarse adjustment of said high speed limit stop by selecting a particular hole of the appropriate group for insertion of said second pin, said first mentioned pin being adjustable in said lug by small increments to provide a fine adjustment for said limit stop.

4. Mechanism for changing the speed setting of an adjustable speed governor comprising, a movable abutment provided with rack teeth, a rotatable shaft having a gear meshing with said rack teeth and a polygonal portion thereon, said gear being capable of assembly with said rack teeth in only one predetermined relation, a shaft rotating pulley mountable on said polygonal portion in different rotational positions relative to said shaft, and means constituting an adjustable high speed limit stop for said mechanism comprising, a pin adjustably secured in a fixed lug, a second pin insertable into any one of a plurality of holes in said pulley to contact said first mentioned pin, said holes being arranged in groups corresponding to different rotational positions of said pulley relative to said shaft and said shaft and said pulley having markings thereon to indicate the appropriate group of holes for insertion of said second pin for each rotational position of said pulley relative to said shaft.

5. Mechanism for changing the speed setting of an adjustable device comprising, a movable abutment provided with rack teeth, a rotatable shaft having a gear meshing with said rack teeth and a polygonal portion thereon, said gear being capable of assembly with said rack teeth in only one predetermined relation, a shaft rotating cable pulley having a single cable thereon mountable on said shaft in different rotational positions relative thereto to bring said cable clamp to any desired location, and means constituting an adjustable high speed limit stop for said mechanism comprising, a pin adjustably secured in a fixed lug, a second pin insertable into any one of a plurality of holes in said pulley to contact said first mentioned pin, said holes being arranged in groups corresponding to different rotational positions of said pulley relative to said shaft and said shaft and said pulley having markings thereon to indicate the appropriate group of holes for insertion of said second pin for each rotational position of said pulley relative to said shaft.

6. Mechanism for changing the speed setting of an adjustable speed governor including a movable abutment, a rack and pinion for moving said abutment, and a pulley for rotating said pinion, said movable abutment comprising, an outer sleeve provided with rack teeth for engagement with said pinion, an inner sleeve adjustably screw threaded into said outer sleeve to constitute an adjustable limit stop, said inner sleeve being split for a portion of its length, and a locking plug for locking said inner sleeve in adjusted position in said outer sleeve.

ERLE MARTIN.
ALAN G. DAY.